Feb. 9, 1943.   J. C. KNIGHT   2,310,700
BATTERY CHARGER
Filed Sept. 11, 1940

INVENTOR.
JOIE C. KNIGHT.
BY
ATTORNEY.

Patented Feb. 9, 1943

2,310,700

UNITED STATES PATENT OFFICE 2,310,700

BATTERY CHARGER

Joie C. Knight, Long Beach, Calif.

Application September 11, 1940, Serial No. 356,253

2 Claims. (Cl. 171—314)

This invention relates to a battery charger whereby a battery charging device is automatically operated to charge the battery when the charge in said battery drops to a predetermined level.

While I am familiar with the so-called trickle chargers, which are now on the market, these chargers introduce a charge into the battery continuously at given intervals. With my arrangement, the battery charger is actuated to charge the battery only when the charge in the battery drops to a predetermined level.

An object of my invention is to provide a novel battery charger in which a photo-electric cell is controlled to start and stop the battery charger.

A feature of my invention resides in the arrangement of a hydrometer float which controls a light beam directed on the photo-electric cell.

An advantage of my invention resides in the maintaining of a substantially full charge in the battery and without danger of overcharging the battery if this battery is not used for a considerable period of time.

My invention is particularly useful in connection with emergency lighting, although it may be used in various other circumstances and conditions.

Other objects, advantages and features of invention may appear from the accompanying drawing, the subjoined detailed description, and the appended claims.

Figure 1:
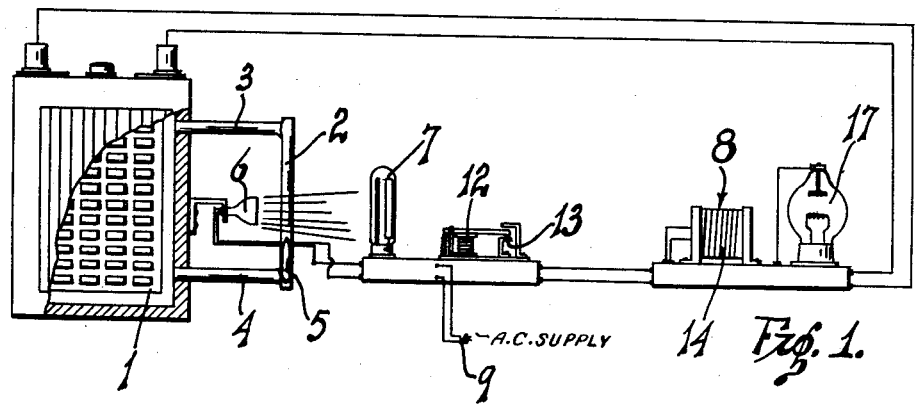
Figure 1 is a side elevation of a battery with parts broken away to show interior construction, and including my novel battery charger.

Referring more particularly to the drawing, the numeral 1 indicates a battery which is being used from time to time for various purposes and consequently the charge in this battery is being reduced. It is necessary then to keep this charge in the battery at substantially the maximum amount.

A vertical glass or transparent tube 2 is connected to the battery by means of upper and lower tubes 3 and 4. The electrolyte in the battery thus fills the tube 2. A hydrometer float 5 is positioned in the tube 2 and rises and falls in this tube as the charge in the battery 1 varies. All of this is usual and well-known. A small light 6 is mounted adjacent the tube 2 and the light from this bulb shines through the tube 2.

When the hydrometer float 5 rises in the tube due to a full charge in the battery, the light from the bulb 6 will be cut off. When the charge in the battery is reduced, the hydrometer 5 drops in the tube 2, permitting the light from the bulb 6 to pass through the tube. A photo-electric cell 7 is mounted adjacent the tube 2 and on the side opposite the bulb 6. The photo-electric cell 7 controls the battery charger 8 in substantially the following manner:

An outside source of alternating current of the usual 110 to 120 volt type, shown at 9, feeds current to a transformer 10. An amplifying tube 11 and a relay 12 are connected in a circuit with the transformer 10, and also with the photo-electric cell 7. This particular electrical circuit is usual and well-known, and the details of the circuit form no part of this invention. Such a typical circuit is shown in Figure 2.

When the hydrometer float 5 drops in the tube 2, the light from the bulb 6 will shine on the photo-electric cell 7, thus actuating this cell and in turn actuating the relay 12. When the relay 12 is thus actuated, the switch contact 13 is closed, thus throwing into the circuit the charging transformer 14 through the leads 15 and 16. A rectifying tube 17 is arranged in the circuit with the transformer 14, substantially as shown in Figure 2, thus introducing a six volt A. C. charge to the battery 1. The battery continues to be charged until the hydrometer float 5 rises in the tube 2, shutting off the light to the photo-electric cell 7. This releases the relay 12 and the charging transformer 14 is cut out of the circuit.

As one example for the use of the battery 1, in theatres when the main current supply sometimes goes off, batteries are used for emergency lighting of exit lights, shown at 18. If the current supply 9 is cut off, the relay 19 is not energized, thus closing the switch contact 20, and current then flows from the battery 1 to the lights 18.

Figure 2:
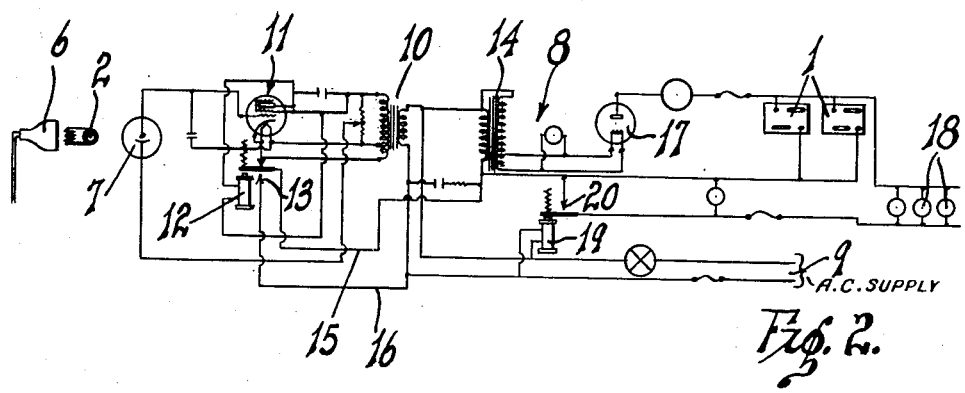
Figure 2 is a wiring diagram of the battery charger and control therefor.

The battery 1 can be used under any circumstances, and I do not wish to limit myself to this emergency lighting arrangement, shown in Figure 2.

Having described my invention, I claim:

1. A system for controlling a battery charger comprising a wet battery, a charging means electrically connected to the battery, a photo-electric cell, means operable by the photo-electric cell and controlling the operation of the charger, a vertical glass tube, said tube being connected at the top and bottom to the electrolyte in the battery, a hydrometer float in said tube, said photo-electric cell being arranged on one side of the tube, a light source on the other side of said tube opposite the photo-electric cell, said hydrometer float controlling the light beam from the light source to the photo-electric cell.

2. A battery charger comprising a wet battery, a charging means electrically connected to the battery, said charging means including a charging transformer, a photo-electric cell, an outside source of electrical energy, a transformer in the photo-electric cell circuit, the outside source of electrical energy being connected to said last mentioned transformer, a relay operable by the photo-electric cell, said relay being electrically connected to the charging transformer and adapted and arranged to direct the outside source of electrical power to the charging transformer when said relay is actuated, a transparent tube connected to the electrolyte in the battery, a hydrometer float in the tube, a light source on one side of said tube, said photo-electric cell being arranged on the other side of the tube, the hydrometer float controlling the beam of light from the light source onto the photo-electric cell.

JOIE C. KNIGHT.